(12) United States Patent
Anaparti et al.

(10) Patent No.: US 11,096,332 B2
(45) Date of Patent: Aug. 24, 2021

(54) NON-STOP ROUND BALER

(71) Applicant: DEERE & COMPANY, Moline, IL (US)

(72) Inventors: Phani Anaparti, Siripuram (IN); Rajasekar Siddheshwaran, Salem (IN)

(73) Assignee: DEERE & COMPANY, Moline, IL (US)

(*) Notice: Subject to any disclaimer, the term of this patent is extended or adjusted under 35 U.S.C. 154(b) by 192 days.

(21) Appl. No.: 16/414,876

(22) Filed: May 17, 2019

(65) Prior Publication Data

US 2019/0380276 A1 Dec. 19, 2019

(30) Foreign Application Priority Data

Jun. 15, 2018 (IN) .............................. 201821022456

(51) Int. Cl.
*A01F 15/07* (2006.01)
*A01F 15/10* (2006.01)
*B30B 9/30* (2006.01)

(52) U.S. Cl.
CPC ........ *A01F 15/0705* (2013.01); *A01F 15/106* (2013.01); *B30B 9/301* (2013.01)

(58) Field of Classification Search
CPC ..... A01F 15/0705; A01F 15/106; B30B 9/301
See application file for complete search history.

(56) References Cited

U.S. PATENT DOCUMENTS

| | | | | |
|---|---|---|---|---|
| 4,584,827 A | * | 4/1986 | Merkey | A01F 15/0705 100/88 |
| 4,686,812 A | | 8/1987 | Bruer et al. | |
| 5,115,734 A | * | 5/1992 | Quartaert | A01F 15/0705 100/5 |
| 9,877,432 B2 | * | 1/2018 | Smith | A01F 15/0705 |
| 10,257,987 B2 | * | 4/2019 | Reints | A01F 15/10 |
| 2001/0013214 A1 | * | 8/2001 | Viaud | A01F 15/0705 53/116 |

(Continued)

FOREIGN PATENT DOCUMENTS

| | | | |
|---|---|---|---|
| DE | 3622451 A1 | 1/1988 | |
| DE | 19932336 A1 * | 1/2001 | ......... A01F 15/0705 |

(Continued)

OTHER PUBLICATIONS

European Search Report issued in counterpart application No. 19179396.7 dated Oct. 29, 2019. (7 pages).

*Primary Examiner* — Arpad Fabian-Kovacs

(57) ABSTRACT

A non-stop round baler is towed by a towing vehicle and is divided into a collection chamber and a baling chamber. The collection chamber is disposed between a pick-up unit and the baling chamber. The collection chamber momentarily stores the crop material before being transferred to the baling chamber. A feed control gate is functionally disposed between the collection chamber and the baling chamber. The feed control gate is selectively switchable between a flow restricting configuration during a bale binding cycle and a bale ejection cycle, and a flow facilitating configuration during a bale forming cycle. When in the flow restricting configuration, the feed control gate blocks crop movement into the baling chamber. When in the flow facilitating configuration, the feed control gate facilitates crop movement into the baling chamber.

12 Claims, 5 Drawing Sheets

(56) References Cited

U.S. PATENT DOCUMENTS

| | | | |
|---|---|---|---|
| 2012/0096827 A1* | 4/2012 | Chaney | A01F 15/106 56/341 |
| 2012/0204734 A1* | 8/2012 | Reijersen Van Buuren | A01F 15/0705 100/3 |
| 2013/0036921 A1* | 2/2013 | Horstmann | A01F 15/0715 100/5 |
| 2014/0157748 A1 | 6/2014 | Olander et al. | |
| 2014/0345481 A1* | 11/2014 | Olander | A01F 15/0833 100/35 |
| 2017/0202150 A1* | 7/2017 | Smith | A01F 15/0705 |
| 2017/0202151 A1* | 7/2017 | Smith | A01F 15/0705 |
| 2019/0223384 A1* | 7/2019 | Frey | A01F 15/0825 |
| 2019/0387684 A1* | 12/2019 | Denis | A01F 15/07 |
| 2020/0000040 A1* | 1/2020 | Bruns | A01F 15/0705 |
| 2020/0170191 A1* | 6/2020 | Devroe | A01F 15/042 |
| 2020/0170192 A1* | 6/2020 | Devroe | A01F 15/046 |
| 2020/0367435 A1* | 11/2020 | Jones | A01F 15/0883 |
| 2020/0404855 A1* | 12/2020 | Frey | A01F 15/07 |

FOREIGN PATENT DOCUMENTS

| | | | | |
|---|---|---|---|---|
| EP | 0276496 A1 * | 8/1988 | | A01F 15/101 |
| EP | 2196082 A1 * | 6/2010 | | A01F 15/106 |
| FR | 2600859 A1 * | 1/1988 | | A01F 15/106 |

* cited by examiner

NON-STOP ROUND BALER

CROSS-REFERENCE TO RELATED APPLICATIONS

This application claims priority to India Patent Application Serial No. 201821022456, filed on Jun. 15, 2018, the disclosure of which is hereby incorporated by reference in its entirety.

TECHNICAL FIELD

The disclosure generally relates to a round baler, and more particularly to a non-stop round baler.

BACKGROUND

In some agricultural operations, after crops are harvested in a field, cut and raked crops are left behind in the field, and may be referred to as "crop material". The crop material that has been dried or otherwise prepared in the field, such as hay, straw or other agricultural material, is often gathered, compressed and shaped by an agricultural baler. The agricultural baler may be a square baler or a round baler. A round baler includes a baling chamber, wherein crop materials from the field are collected for forming and binding into round bales. The round baler includes a press device, e.g. a plurality of press rolls or a press belt, which are transversely positioned within the baler. The press device may be powered by a Power Take Off (PTO) shaft receiving torque from an engine of a vehicle for driving the baler. Typically, the bales are bound with a binding material, e.g. twine or net, inside the bale forming chamber before being discharged onto the ground. If the baler is a combination baler, the bales may be wrapped by a wrapping material, such as, a polymeric sheet or film, after being bound by the binding material.

Typically, round balers are required to be halted after the bale is formed during a bale formation cycle. After the bale formation cycle, the bales are bound by the binding material and ejected from the baling chamber. The necessity to halt the round balers in order to discharge a completed bale increases the downtime of the round baler.

Thus, there is felt a need for a simple and efficient arrangement to achieve non-stop operation of a round baler which may help in minimizing the unproductive time of the round baler.

SUMMARY

In accordance with the present disclosure, there is provided a non-stop round baler comprising a collection chamber disposed between a pickup unit and a baling chamber of the baler. The non-stop round baler has a tailgate upstream of the baling chamber. The collection chamber may include a conveyer belt. The conveyor belt is configured to facilitate transfer of the crop material to the baling chamber. The pickup unit is configured to pick crop material from the ground. The baling chamber receives crop material picked up by the pickup unit to form bales. The baling chamber facilitates at least one operational cycle. The at least one operational cycle includes a bale formation cycle, a bale binding cycle and a bale ejection cycle. The tailgate cooperates with the baling chamber and is operable to discharge bales from the baling chamber during the operational cycle.

A feed control gate is functionally disposed between the collection chamber and the baling chamber. The feed control gate is selectively switchable between a flow restricting configuration and a flow facilitating configuration corresponding to the operational cycle of the baling chamber. The feed control gate is disposed in the flow restricting configuration during a bale binding cycle and a bale ejection cycle. When in the flow restricting configuration, the feed control gate is configured to restrict flow of the crop material from the collection chamber to the baling chamber. The feed control gate may include a plurality of slats mounted along the length of a shaft. The feed control gate has a rotational axis orthogonal to the direction of flow of crop material from the collection chamber to the baling chamber. When disposed in the flow facilitating configuration, the feed control gate is powered to rotate about the rotational axis via a baler drive arrangement. The feed control gate is brought to a halt in the flow restricting configuration.

A motion altering mechanism is functionally associated with the feed control gate. The motion altering mechanism is configured to switch the operation of the feed control gate between the flow restricting configuration and the flow facilitating configuration. The motion altering mechanism is displaceable between a first position and a second position in the flow restricting configuration and the flow facilitating configuration. The motion altering mechanism includes a link having a motion transmitting roller and a braking element. The motion transmitting roller is configured to communicate motion from the baler drive arrangement to the shaft. The braking element is configured to halt rotation of the shaft. The motion altering mechanism is actuated by at least one of an electronic controlling system and/or a mechanical controlling system.

The collection chamber further includes a feeder unit mounted in the collection chamber. The feeder unit includes a plurality of fingers extending from an operative top side of the collection chamber. The plurality of fingers are configured to move the crop material towards the baling chamber. The feed control gate is disposed in the flow facilitating configuration during a bale formation cycle. When the feed control gate is disposed in the flow facilitating configuration, the feed control gate is configured to transfer the crop material from the collection chamber to the baling chamber.

Accordingly, the present disclosure has several technical advancements, including but not limited to the realization of: 1) providing for a collection chamber downstream of a baling chamber of a baler for continuous collection of crop material during operation of the non-stop baler; 2) providing for a feed control gate between the collection chamber and the baling chamber to avoid clogging problem by selectively enabling flow from the collection chamber to the baling chamber; and 3) providing light weight non-stop round baler which can be towed, lifted and lowered by a Three Point Linkage (TPL).

While the foregoing specification has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure which comes within known or customary practice in the art to which this disclosure pertains.

The above features and advantages and other features and advantages of the present teachings are readily apparent from the following detailed description of the best modes for carrying out the teachings when taken in connection with the accompanying drawings.

The embodiments herein and various features and advantageous details thereof are explained with reference to non-limiting embodiments in the following description. Descriptions of well-known components and processing techniques are omitted to avoid unnecessarily obscure the embodiments.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "substantially" or "approximately" are understood by those of ordinary skill to refer to reasonable ranges outside of the given value, for example, general tolerances associated with manufacturing, assembly, and use of the described embodiments.

Figure 1:
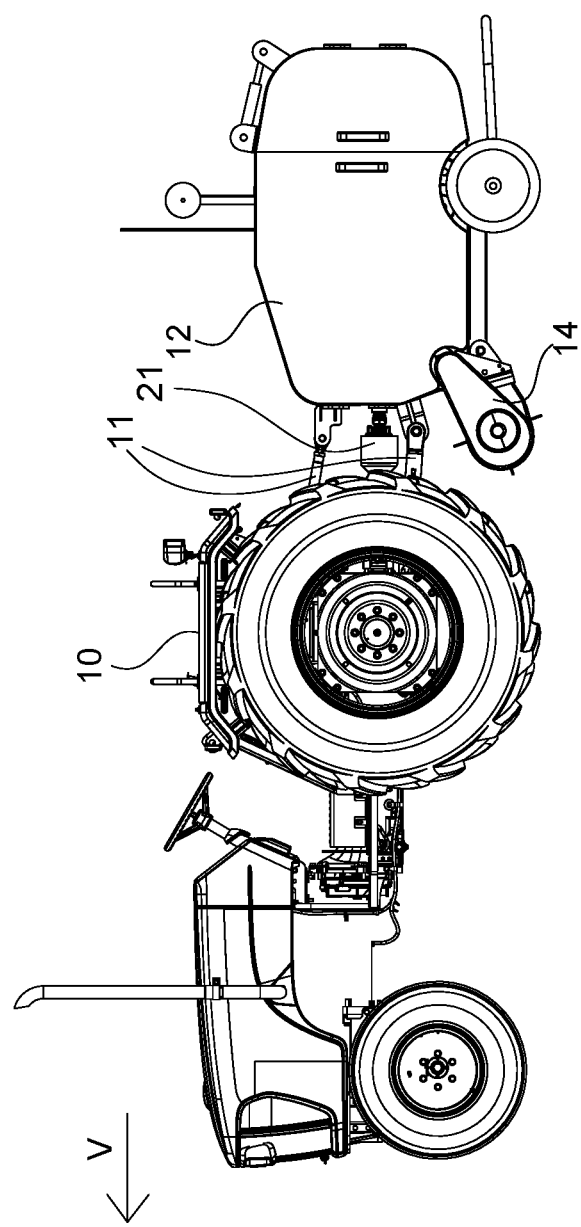
FIG. 1 is a schematic side view of a tractor with a non-stop round baler, in accordance with the present disclosure.

Referring to the Figures, wherein like numerals indicate like parts throughout the several views, FIG. 1 illustrates a tractor 10 used to tow a non-stop round baler 12, in accordance with the present disclosure, along a forward towing direction V. Hereinafter, all indicated directions and location of the non-stop round baler 12, such as, forward, backward, rear, front, up, above, down, left and right shall be determined with reference to the forward towing direction V of the non-stop round baler 12 in the field and should not be understood to be limiting. The non-stop baler 12 cooperates with the tractor 10 via a Three Point Linkage (TPL) 11. The non-stop round baler 12 may be pulled, lifted and lowered by the TPL 11. Alternatively, the non-stop round baler 12 may be drawn by the tractor 10 by a drawbar. The non-stop round baler 12 is mounted on a support frame 17 of a chassis. The non-stop round baler 12 includes a pick-up unit 14 provided at the front end of the non-stop round baler 12 to collect a crop material, such as hay and forage from the ground. The non-stop round baler 12 includes a baling chamber 16 and a collection chamber 18. The crop material collected by the pick-up unit 14 is conveyed to the collection chamber 18. The crop material is fed into the baling chamber 16 from the collection chamber 18. During operation, the non-stop round baler 12 has operational cycles, namely, a bale formation cycle, a bale tying cycle, and a bale ejection cycle. The non-stop round baler 12 is fed with crop material in the bale formation cycle, during which a bale is formed within the baling chamber 16. After the bale is formed, the bale tying cycle is initiated, wherein the bale is tied by a binding material, such as, twine or net. Upon completion of the bale tying cycle, the bale is ejected from a rear end of the non-stop round baler 12, onto the ground.

Figure 2:
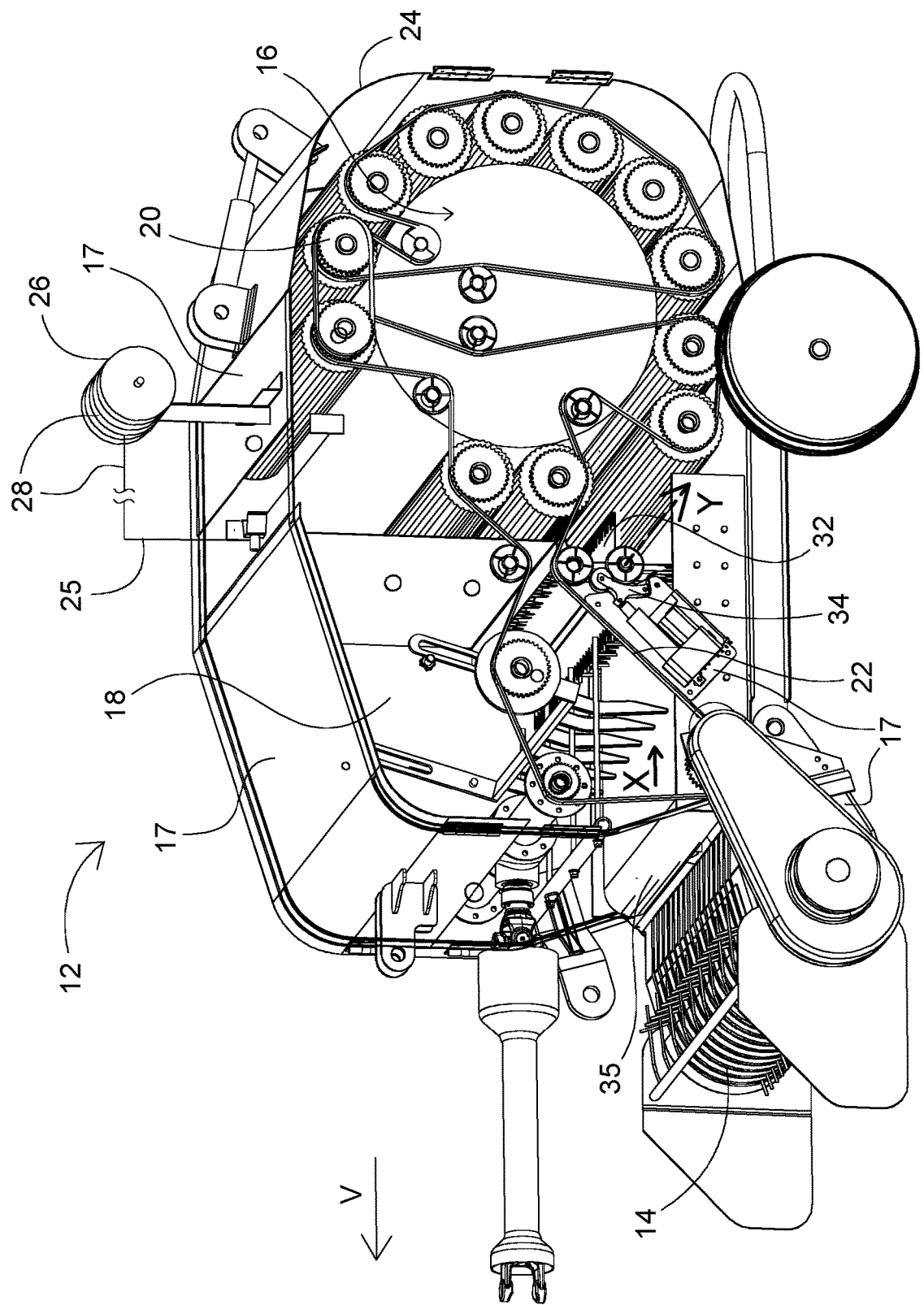
FIG. 2 is a schematic exposed perspective overview of the non-stop round baler showing a collection chamber and a baling chamber, in accordance with the present disclosure.

Referring to FIG. 2, the baling chamber 16 includes a plurality of press rolls 20 provided along the inner periphery of the baling chamber 16. Each of the press rolls 20 is configured to rotate about a respective axis. The rotation of the press rolls 20 helps in agitating the crop material for efficient formation of the bales and brings together the crop material, thereby enabling formation of bales. Although the present disclosure will hence forth be explained with reference to the non-stop round baler 12 as being a fixed chamber baler, a person skilled in the art will appreciate that the non-stop round baler 12 may alternatively be configured as a variable chamber baler.

The press rolls 20 are rotated about their respective axis by a drive torque, which may be provided by a Power Take Off (PTO) 21 via a baler drive arrangement 19. The baler drive arrangement 19 includes a belt 22 and a plurality of drive rollers 23 for operating various components of the non-stop round baler 12. The baling chamber 16 includes a crop inlet and a bale outlet. The crop inlet is upstream of the pick-up unit 14. The bale outlet is at the rear end of the non-stop round baler 12. The bale outlet of the baling chamber 16 is formed by a tailgate 24 provided at the rear end of the baling chamber 16. The tailgate 24 is opened to eject the bale from the baling chamber 16, in the bale ejection cycle.

A twine system, having a dispensing arm 25 and a twine roll 26, may be disposed proximate the front end of the baling chamber 16. The twine roll 26 is operable to dispense binding material, such as, a twine 28. The dispensing arm 25 dispenses the twine 28 from the twine roll 26 into the baling chamber 16 for binding a bale formed in the baling chamber 16. The twine 28 is inserted into the baling chamber 16, proximate to the press rolls 20, such that, as the press rolls 20 rotate the bale, the twine 28 tightly binds around the bale formed in the baling chamber 16.

Again, referring to FIGS. 2-4, the collection chamber 18 is disposed between the pickup unit 14 and the baling chamber 16. The pickup unit 14, the bailing chamber 16, and the collection chamber 18 are each coupled with a support frame 17. The collection chamber 18 is defined by four sides. At least one side is defined by a conveyer belt 35. In the drawings, the bottom wall is formed by the conveyor belt 35. The conveyor belt 35 is an endless belt, running along the length of the collection chamber 18, from the front end to the rear end of the collection chamber 18. The conveyor belt 35 conveys the crop material in a X-direction towards the baling chamber 16.

The collection chamber 18 includes a feeder unit 30, a feed control gate 32 and a motion altering mechanism 34. In addition to the conveyor belt 35 which facilitates moving the crop material from the collection chamber 18 to the baling chamber 16, the feeder unit 30 also causes the crop material to be moved into the baling chamber 16. The feeder unit includes a plurality of fingers 31 extending from an operative top side of the collection chamber 18. The plurality of fingers 31 is configured to push the crop material towards the baling chamber 16.

When the crop material is fed into the baling chamber 16, the press rolls 20 begin to bring together the crop material, thereby forming a bale. This is part of the bale formation cycle. When the bale of a required size is formed in the baling chamber 18, the bale is tied by the twine 28 dispensed by the twine roll 26. This is part of the bale tying cycle. After the completion of the bale tying cycle, the bale ejection cycle is initiated, wherein the tailgate 24 is opening and the bale tied by the twine 28 is pushed out of the baling chamber 16 onto the ground.

Figure 6:
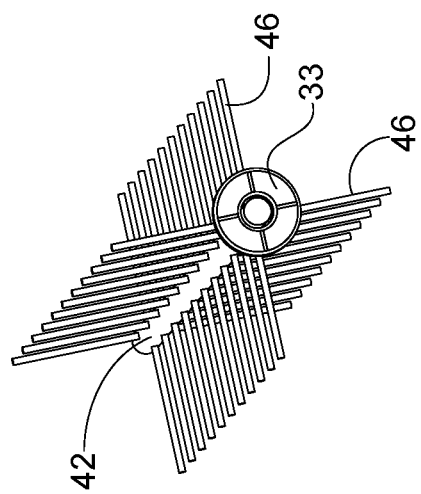
FIG. 6 is a schematic perspective view of an alternate embodiment of the feed control gate of the non-stop round baler, in accordance with the present disclosure.
Figure 5:
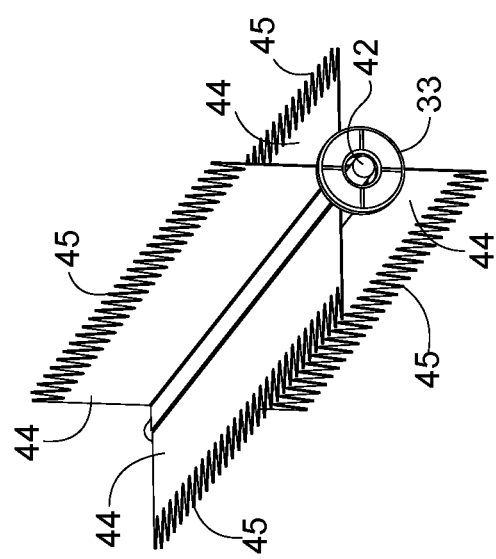
FIG. 5 is a schematic perspective view of a feed control gate of the non-stop round baler, in accordance with the present disclosure.

The feed control gate 32 is disposed between the collection chamber 18 and the baling chamber 16. Referring to FIG. 5, the feed control gate 32, in accordance with one embodiment, includes a shaft 42 on which a plurality of serrated slats 44 are mounted along the length thereof, in a circumferentially spaced apart configuration. The shaft 42 has a rotational axis Y which is orthogonal to the crop flow direction X of the crop material from the collection chamber 18 to the baling chamber 16. During rotation of the feed control gate 32, the serrated slats 44 causes the crop material, proximate to the feed control gate 32, to be pushed from the collection chamber 18 into the baling chamber 16. FIG. 6, illustrates an alternate embodiment of the feed control gate 32, wherein, the serrated slats 44 are replaced with a plurality of sets of tines 46. The plurality of sets of tines 46 is arranged in an angularly spaced apart configuration.

The feed control gate 32 is selectively switchable between a flow restricting configuration and a flow facilitating configuration. The feed control gate 32 is in the flow facilitating configuration for feeding the baling chamber 16 with the crop material, described above, during the bale formation cycle. On the other hand, the feed control gate 32 switches to the flow restricting configuration during the bale tying cycle and the bale ejection cycle. In the flow restricting configuration, the crop material is obstructed from flowing from the collection chamber 18 to the baling chamber 16. The feed control gate 32 is in the flow restricting configuration after completion of the bale formation cycle and during the bale tying cycle and bale ejection cycle.

Figure 3:
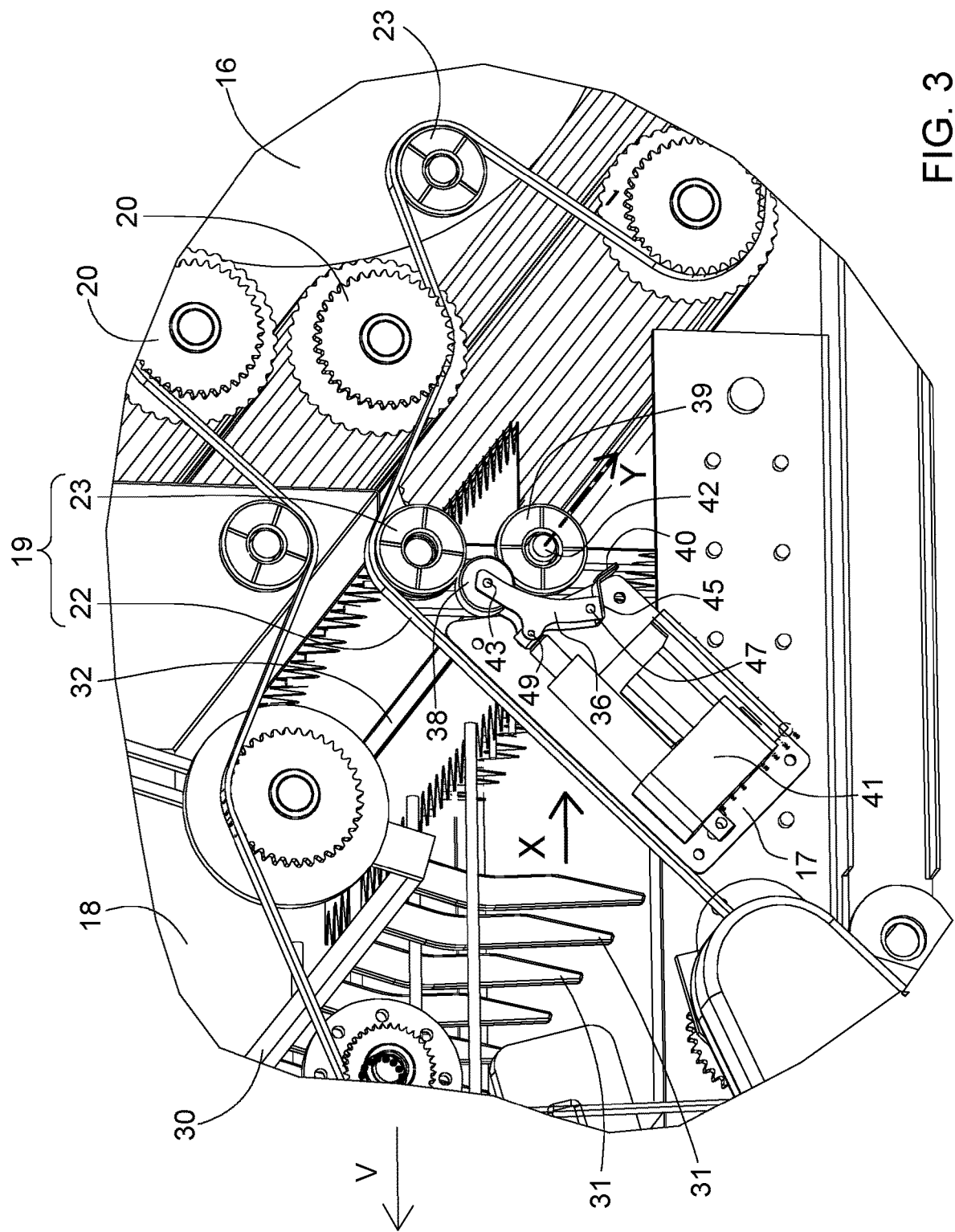
FIG. 3 is an enlarged schematic fragmentary exposed perspective view of the non-stop round baler showing a motion altering mechanism in a flow facilitating configuration.
Figure 4:
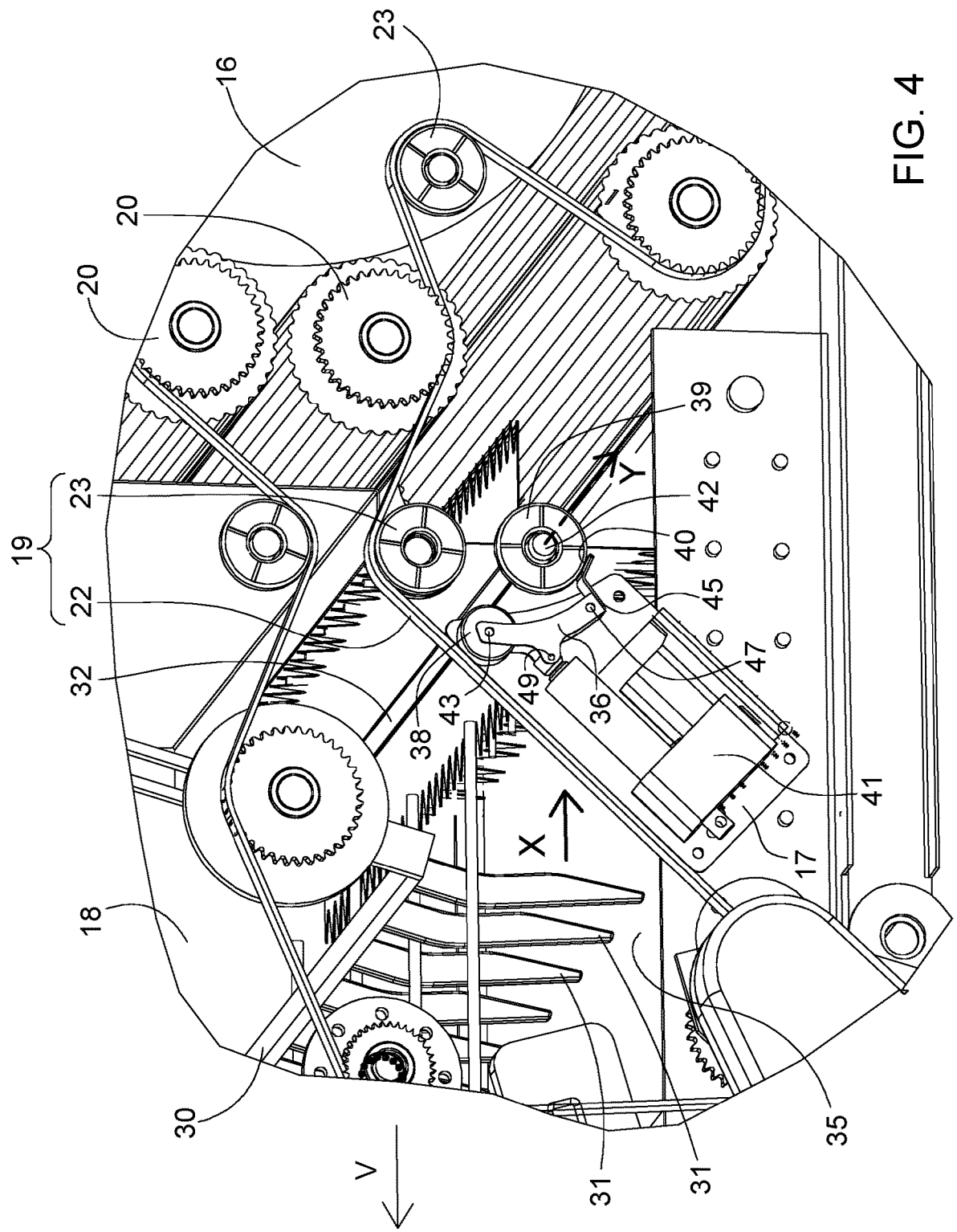
FIG. 4 is an enlarged schematic fragmentary exposed perspective view of the non-stop round baler showing the motion altering mechanism in a flow restricting configuration.

The switching of the feed control gate 32 between the flow facilitating configuration and the flow restricting configuration is achieved by the motion altering mechanism 34, shown in FIGS. 3 and 4, respectively. The motion altering mechanism 34 includes a link 36 having a motion transmitting roller 38 and a braking element 40. The link 36 is connected with the motion transmitting roller 38 at a first connection location 43. The link is also connected with the braking element 40 at a second connection location 45. The link 36 is pivotally coupled with the support frame 17 of the round baler 12 at a third connection location 47. The link 36 has a predefined profile, such as, arcuate profile, curved shape or V-shape. As shown in FIG. 3, the motion transmitting roller 38 is configured to communicate motion from the baler drive arrangement 19 to the feed control gate 32 in the flow facilitating configuration. As shown in FIG. 4, the braking element 40 is configured to halt rotation of the shaft 42, in the flow restricting configuration.

In accordance with an exemplary embodiment of the disclosure, the motion altering mechanism 34 is actuated by an electronic controlling system, which includes at least one sensor (not shown in Figure), a controller (not shown in Figure) and an actuator 41.

The sensor is configured to detect the operational cycle of the baling chamber 16 of the non-stop round baler 12. A signal corresponding to the operational cycle of the baling chamber 16 is transmitted from the sensor to the controller. The controller then triggers the actuator 41 to actuate movement of the motion altering mechanism 34. The actuator 41 is interconnected with the support frame 17 and the actuator 41 is rotatably connected with the link 36 at a fourth connection location 49. The fourth connection location can be positioned between the first connection location and the third connection location. The movement of the motion altering mechanism 34 causes the feed control gate 32 to be switched between the flow restricting configuration and the flow facilitating configuration. Thus, when the sensor detects that the baling chamber 16 is operating in the bale formation cycle, corresponding signals are transmitted to the controller. The controller on receiving the signals from the sensor, triggers the actuator 41 to functionally engage the motion transmitting roller 38 between a belt 22 of the baler drive arrangement 19 and the feed control gate 32. This causes the feed control gate 32 to be in the flow facilitating configuration. On the other hand, when the sensor detects that the baling chamber 16 is operating in the bale tying cycle or the bale ejection cycle, corresponding signals are transmitted to the controller by the sensor. The controller on receiving the signal from the sensor, triggers the actuator 41 to functionally engage the braking element 40 to a feed gate roller 39 of the feed control gate 32 while simultaneously moving the motion transmitting roller 38 out of engagement with the belt 22 and the feed control gate 32. This causes the feed control gate 32 to be in the flow restricting configuration, thereby obstructing flow of the crop material from the collection chamber 18 to the baling chamber 16. Alternatively, the motion altering mechanism 34 may be actuated by a mechanical controlling system. A person skilled in the art will appreciate that, although the motion altering mechanism 34 disclosed herein is described as illustrated in FIGS. 3 and 4, the motion altering mechanism 34 may include some other arrangement that is capable of switching the feed control gate 32 between the flow restricting configuration and the flow facilitating configuration.

Referring to FIGS. 2-4, during operation, when the non-stop round baler 10 is operating on the field, the pick-up unit 14 continuously picks up the crop material from the field onto the conveyor belt 35 in the collection chamber 18. The conveyor belt 35 facilitates in shifting the crop material towards the baling chamber 16. The movement of the crop material from the collection chamber 18 to the baling chamber 16 is further assisted by the feeder unit 30. The serrated slats 44 of the feed control gate 32, which are in the flow facilitating configuration, causes the crop material to be further pushed into the baling chamber 16. Thus, the conveyor belt 35, the feeder unit 30 and the feed control gate 32 facilitates the crop material to be moved from the collection chamber 18 to the baling chamber 16. The baling chamber 16 is continued to be filled with the crop material during the bale formation cycle.

When the required size of a bale is formed in the baling chamber 16, the bale tying cycle and the bale ejection cycle are initiated. During the bale tying cycle and the bale ejection cycle, the feed control gate 32 is switched to the flow restricting configuration. In the flow restricting configuration, one of the serrated slats 44 acts a gate to obstruct flow of the crop material from the collection chamber 18 to the baling chamber 16. While the feed control gate 32 is in the feed restricting configuration, the pick-up unit 14 continues to collect the crop material from the field onto the conveyor belt 35 in the collection chamber 18. The conveyor belt 35 tends to move the crop material towards the baling chamber 16. However, as the serrated slat 44 of the feed control gate 32 acts to obstruct the flow of the crop material inside the baling chamber 16, the crop material continues to collect in the collection chamber 18. Meanwhile, the feeder unit 30 continues to push the crop material towards the feed control gate 32, which results in compressing the crop material between the feed control gate 32 and the feeder unit 30. After the bale is ejected from the baling chamber 16 during the bale ejection cycle, the operation of the feed control gate 32 is switched from the feed restricting configuration to the feed facilitating configuration, thereby allowing flow of the crop material in the collection chamber to flow into the baling chamber 16. The switching of the feed control gate 32 between the flow restricting configuration and the flow facilitating configuration is continued during operation of the non-stop round baler. This helps enable continuous operation of the non-stop round baler 12, without halting crop collection after a bale is formed in the baling chamber and until the bale is ejected from the baling chamber 16.

Thus, the present disclosure provides a non-stop round baler 12, which helps in increasing the efficiency of the baling process by providing the collection chamber 18 before the baling chamber 16. Also, the arrangement providing the feed control gate 32, between the collection chamber 18 and the baling chamber 16 facilitates feeding crop material from the collection chamber during bale formation cycle, and obstructs the flow of crop material during the bale tying cycle and the bale ejection cycle. Thus, the disclosure provides a compact, continuously operating round baler.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:
1. A round baler comprising:
a support frame;
a pickup unit attached to the support frame and operable to pick crop material from the ground;
a baling chamber attached to the support frame and operable to receive the crop material from the pickup unit and form the crop material into a bale;
a collection chamber attached to the support frame and disposed between the pickup unit and the baling chamber;
a feed control gate functionally disposed between the collection chamber and the baling chamber, the feed control gate being selectively switchable between a flow restricting configuration and a flow facilitating configuration dependent upon an operational cycle of the baling chamber; and
a motion altering mechanism functionally associated with the feed control gate, the motion altering mechanism operable to switch the operation of the feed control gate between the flow restricting configuration and the flow facilitating configuration;
wherein the motion altering mechanism is moveable between a first position and a second position to move the feed control gate between the flow restricting configuration and the flow facilitating configuration;
wherein the motion altering mechanism includes a link including a first connection location having a motion transmitting roller rotatably attached to the link at the first connection location, and wherein the link includes a second connection location having a braking element attached to the link at the second connection location;
wherein the link is pivotally coupled to the support frame at a third connection location, with the third connection location positioned between the first connection location and the third connection location;
wherein the motion transmitting roller is configured to communicate motion from a baler drive arrangement to the feed control gate when the motion altering mechanism is disposed in the first position;
wherein the braking element is configured to halt motion of the feed control gate when the motion altering mechanism is disposed in the second position; and
an actuator interconnecting the support frame and the link and selectively controllable to rotate the link about the third connection location to actuate the motion altering mechanism between the first position and the second position.

2. The baler as claimed in claim 1, wherein the operational cycle of the baling chamber includes a bale formation cycle, a bale binding cycle and a bale ejection cycle.

3. The baler as claimed in claim 1, wherein the collection chamber includes a conveyer belt operable to facilitate transfer of the crop material to the baling chamber.

4. The baler as claimed in claim 1, further comprising a feeder unit mounted in the collection chamber, the feeder unit including a plurality of fingers extending from an operative top side of the collection chamber, the plurality of fingers configured to move the crop material towards the baling chamber.

5. The baler as claimed in claim 1, wherein the feed control gate is disposed in the flow facilitating configuration during a bale formation cycle, and wherein the feed control gate is configured to transfer the crop material from the collection chamber to the baling chamber when disposed in the flow facilitating configuration.

6. The baler as claimed in claim 1, wherein the feed control gate is disposed in the flow restricting configuration during a bale binding cycle and a bale ejection cycle, and wherein the feed control gate is configured to restrict flow of the crop material from the collection chamber to the baling chamber when disposed in the flow restricting configuration.

7. The baler as claimed in claim 1, wherein the feed control gate includes a plurality of slats mounted along a length of a shaft, the feed control gate having a rotational axis orthogonal to the direction of flow of crop material moving from the collection chamber to the baling chamber.

8. The baler as claimed in claim 1, wherein the feed control gate is powered to rotate about a rotational axis Y in the flow facilitating configuration via a baler drive arrangement, and wherein the feed control gate is brought to a halt in the flow restricting configuration.

9. The baler as claimed in claim 1, wherein the motion altering mechanism is moveable between a first position and a second position to move the feed control gate between the flow restricting configuration and the flow facilitating configuration.

10. The baler as claimed in claim 1, wherein the link comprises one of an arcuate shape profile, a curved shape profile, or a V-shaped profile.

11. The baler as claimed in claim 1, wherein the actuator is attached to the link at a fourth connection location.

12. The baler as claimed in claim 11, wherein the fourth connection location is positioned between the first connection location and the third connection location.

* * * * *